(12) United States Patent
Su

(10) Patent No.: US 10,778,827 B2
(45) Date of Patent: Sep. 15, 2020

(54) WIRELESS SIGNAL TRANSCEIVING METHOD AND WIRELESS SIGNAL TRANSCEIVING SYSTEM USING THE SAME

(71) Applicant: GEAR RADIO ELECTRONICS CORP., Zhubei, Hsinchu County (JP)

(72) Inventor: I-Feng Su, Hsinchu (TW)

(73) Assignee: GEAR RADIO ELECTRONICS CORP. (TW)

( * ) Notice: Subject to any disclaimer, the term of this patent is extended or adjusted under 35 U.S.C. 154(b) by 0 days.

(21) Appl. No.: 16/683,831

(22) Filed: Nov. 14, 2019

(65) Prior Publication Data

US 2020/0228640 A1    Jul. 16, 2020

Related U.S. Application Data

(60) Provisional application No. 62/791,908, filed on Jan. 14, 2019.

(51) Int. Cl.
| | |
|---|---|
| *H04W 76/10* | (2018.01) |
| *H04L 5/00* | (2006.01) |
| *H04M 1/60* | (2006.01) |
| *H04R 5/033* | (2006.01) |
| *H04R 1/10* | (2006.01) |
| *H04W 4/80* | (2018.01) |

(52) U.S. Cl.
CPC ........ *H04M 1/6066* (2013.01); *H04L 5/0055* (2013.01); *H04R 1/1016* (2013.01); *H04R 5/033* (2013.01); *H04W 4/80* (2018.02); *H04W 76/10* (2018.02); *H04M 2250/02* (2013.01); *H04R 2420/07* (2013.01)

(58) Field of Classification Search
CPC . H04M 1/6066; H04M 2250/02; H04W 4/80; H04W 76/10; H04L 5/0055; H04R 1/1016; H04R 5/033; H04R 2420/07
USPC ...................................... 455/569.1
See application file for complete search history.

(56) References Cited

U.S. PATENT DOCUMENTS 10,631,363 B1 * 4/2020 Xian ............... H04R 1/1041
2018/0302757 A1 * 10/2018 Kanbara ............ H04L 65/60

* cited by examiner

*Primary Examiner* — Lee Nguyen
(74) *Attorney, Agent, or Firm* — Innovation Counsel LLP

(57) ABSTRACT

A wireless signal transceiving system includes includes a first wireless signal transceiver device and a second wireless signal transceiver device. The first wireless signal transceiver device and the second wireless signal transceiver device are configured to establish an assimilation link to become a pseudo single device through an assimilation process, and to establish a wireless link between the pseudo single device with an electronic device. After the pseudo single device receives a first packet wirelessly transmitted by the electronic device, the pseudo single device transmits an second packet to the electronic device.

20 Claims, 4 Drawing Sheets

WIRELESS SIGNAL TRANSCEIVING METHOD AND WIRELESS SIGNAL TRANSCEIVING SYSTEM USING THE SAME

This application claims the benefit of U.S. provisional application Ser. No. 62/791,908, filed Jan. 14, 2019, the subject matter of which is incorporated herein by reference

FIELD OF THE INVENTION

The invention relates to a wireless signal transceiving method and a wireless signal transceiving system using the same using the same, and more particularly to a wireless signal transceiving method and a wireless signal transceiving system using the same.

BACKGROUND OF THE INVENTION

In the wireless communication industry, an electronic device could transmit wireless signal to one of two wireless devices, and then the wireless device transmits the wireless signal to another wireless device. During the communication between the wireless devices, the wireless devices must confirm whether the wireless signal transmitted by the electronic device is received by the wireless devices. However, such wireless communication method results in lengthy communication time.

Therefore, it is important to increase the communication efficiency on wireless communication among the electronic device and several wireless devices.

SUMMARY OF THE INVENTION

In one embodiment of the invention, a wireless signal transceiving method includes the following steps. An assimilation link between a first wireless transceiver device and a second wireless transceiver device is established, such that the first wireless transceiver device and the second wireless transceiver device become a pseudo single device through an assimilation process; a wireless link between the pseudo single device and an electronic device is established; a first packet wirelessly transmitted by the electronic device is received by the pseudo single device, and after the pseudo single device receives the first packet, a second packet is transmitted to the electronic device by the pseudo single device.

In another embodiment of the invention, a wireless signal transceiving system includes an electronic device, a first wireless transceiver device and a second wireless transceiver device. The first wireless transceiver device and the second wireless transceiver device are configured to establish an assimilation link to become a pseudo single device through an assimilation process, and to establish a wireless link between the pseudo single device with the electronic device. After the pseudo single device receives a first packet wirelessly transmitted by the electronic device, the pseudo single device transmits an second packet to the electronic device.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

Figure 1A:
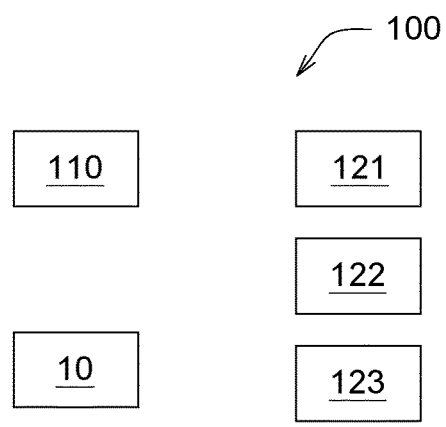
FIGS. 1A to 1E(b) illustrate processes of a wireless signal transceiving method of a wireless signal transceiving system according to an embodiment of the invention.
Figure 1B:
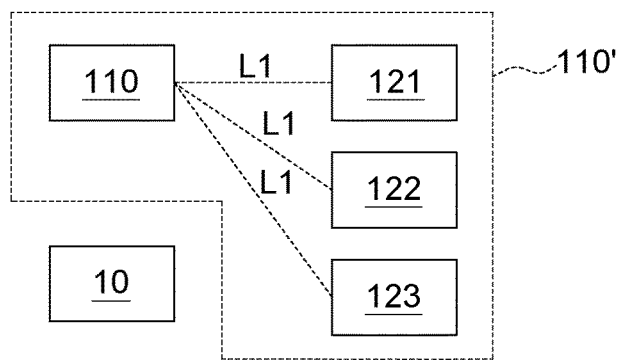
Figure 1C:
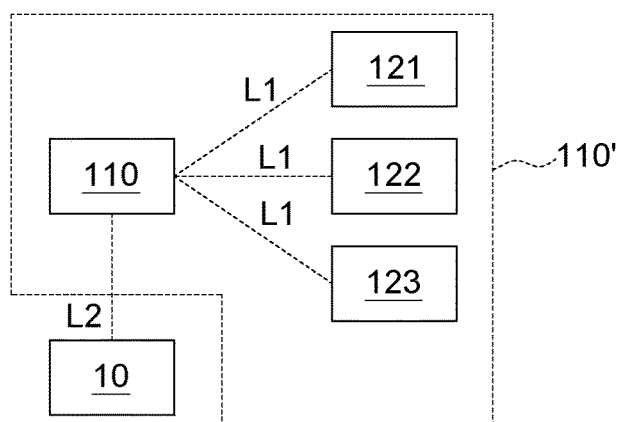
Figure 1D:
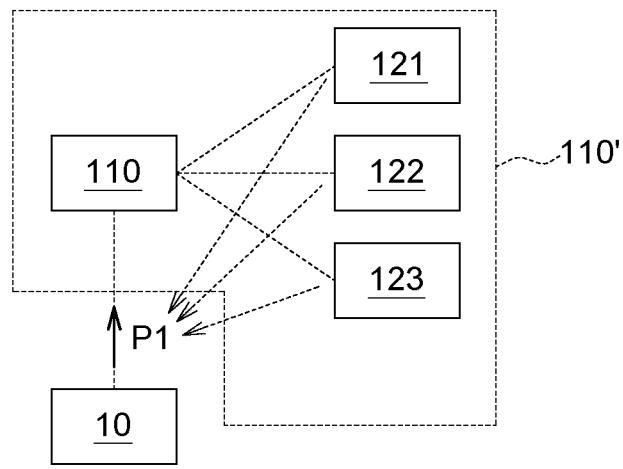
Figure 1D:
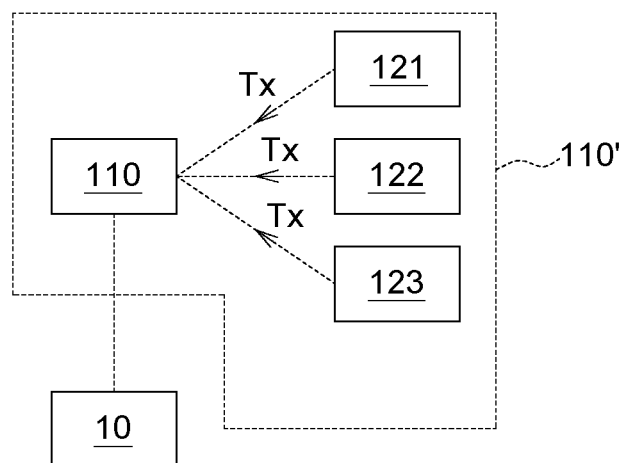
Figure 1E:
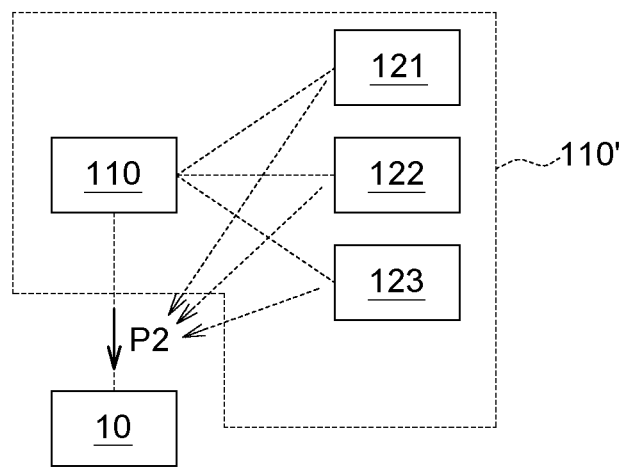
Figure 1E:
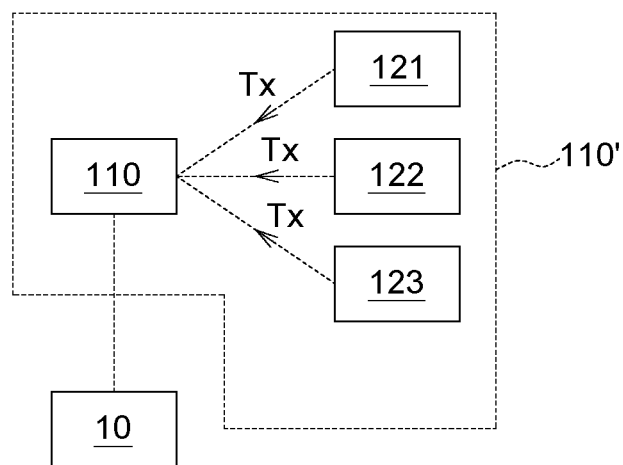
Figure 2:
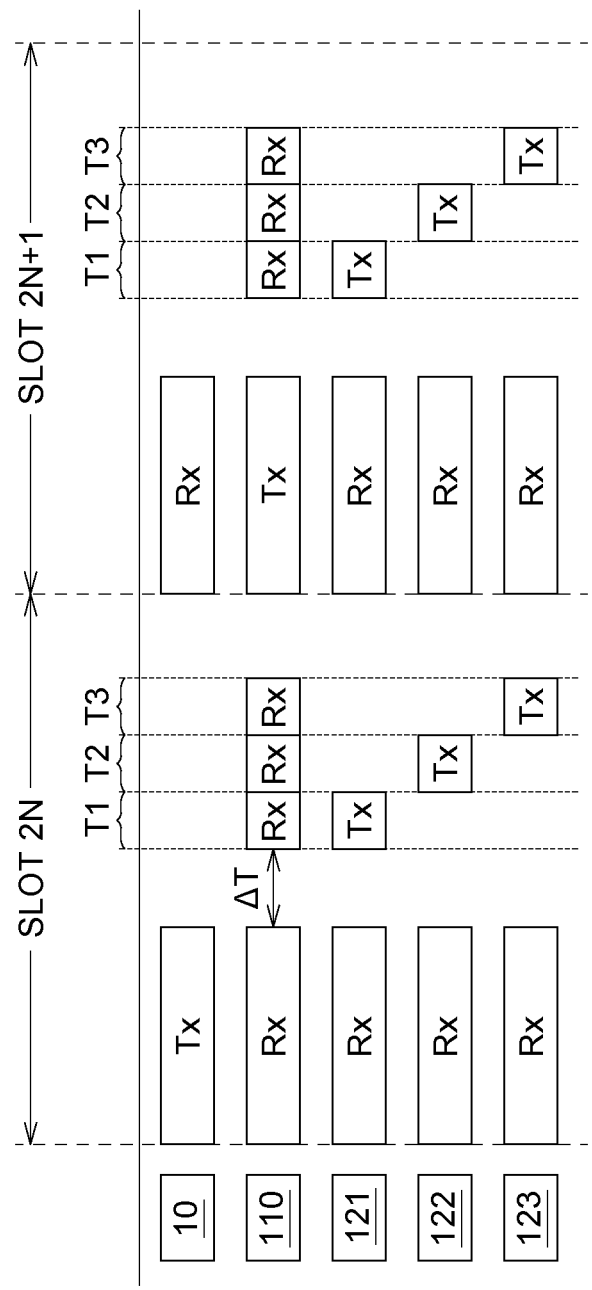
FIG. 2 illustrates a timing diagram illustrating operation of the wireless system for this case between two consecutive timing slots 2N and 2N+1.

Referring to FIGS. 1A to 1E(b) and 2, FIGS. 1A to 1E(b) illustrate processes of a wireless signal transceiving method of a wireless signal transceiving system 100 according to an embodiment of the invention, and FIG. 2 illustrates a timing diagram illustrating operation of the wireless system for this case between two consecutive timing slots 2N and 2N+1.

As shown in FIG. 1A, a wireless signal transceiving system 100 is provided. The wireless signal transceiving system 100 includes an electronic device 10, a first wireless transceiver device 110 and a number of second wireless transceiver devices 121, 122 and 123. In an embodiment, the electronic device 10 is, for example, a handheld electronic device 10 (such as, a mobile phone) providing an audio source, and the first wireless transceiver device 110 and the second wireless transceiver devices 120 are, for example, wireless earphones, loudspeakers, etc., but the embodiment of the invention is not limited thereto.

In the present embodiment, there is no any physical wire connected between the first wireless transceiver device 110 and the second wireless transceiver devices 120. The first wireless transceiver device 110 and the second wireless transceiver device 120 could communicate with each other through wireless communication technology, for example, Bluetooth protocol or Wi-Fi® (based on the IEEE 802.11 family of standards of the Institute of Electrical and Electronics Engineers) or the like.

Although not illustrated, each of the first wireless transceiver device 110 and the second wireless transceiver devices 120 includes a wireless transceiver, wherein the first wireless transceiver device 110 and the second wireless transceiver device 120 wirelessly communicate with each other through the wireless transceivers.

As shown in FIG. 1B, an assimilation link L1 is established between the first wireless transceiver device 110 and each second wireless transceiver device 120 through assimilation process, such that the first wireless transceiver device 110 and the second wireless transceiver devices 120 become a pseudo single device 100' through the assimilation link L1.

In the present embodiment, the first wireless transceiver device 110 serves/presets as the primary wireless transceiver device in the pseudo single device 100'. The others of the wireless transceiver device in the pseudo single device 100', such as the second wireless transceiver devices 121 to 123, serves/presets as the secondary wireless transceiver devices. During the assimilation process, the primary wireless transceiver device (for example, the first wireless transceiver device 110) transmits characteristic messages to the secondary wireless transceiver devices (for example, the second wireless transceiver devices 121 to 123), wherein the characteristic messages includes clock tick, pseudo random seek, keys for encryption process, etc. The assimilation link L1 is established according to the characteristic messages by any suitable assimilation technique.

The assimilation link L1 is, for example, Bluetooth connection or Wi-Fi connection. Due to the first wireless transceiver device 110 and the second wireless transceiver devices 120 become one pseudo single device 100', a display (not illustrated) of the electronic device 10 could display one connection one icon (or symbol) of one of the first wireless transceiver device 110 and the second wireless transceiver device 120 to represent the pseudo single device 100'.

As shown in FIG. 1C, a wireless link L2 is established between the pseudo single device 100' with the electronic device 10 through standard wireless protocol, such as Bluetooth protocol, Wi-Fi protocol, etc. The wireless link L2 is, for example, Bluetooth connection or Wi-Fi connection. In the present embodiment, the first wireless transceiver device 110 serves/presets as the primary wireless transceiver device in the pseudo single device 100', and thus the wireless link L2 between the electronic device 10 and the pseudo single device 100' is established by the first wireless transceiver device 110 and the electronic device 10.

As shown in FIGS. 1D(a) and 2, after the wireless link L2 is established, the electronic device 10 could transmit a first packet P1, for example, audio packet, to the first wireless transceiver device 110 of the pseudo single device 100'. The first packet P1 could at least include audio information. Due to the assimilation link L1, each second wireless transceiver device could snoop (or listen) the wireless link L2 between the first wireless transceiver device 110 and the electronic device 10. In the present embodiment, the second wireless transceiver device 121 to 123 could obtain packet on the assimilation link L1 through snooping, and thus there is no need to transmit any packet between the first wireless transceiver device 110 and the second transceiver wireless devices 121 to 123.

As shown in FIGS. 1D(b) and 2, when the second wireless transceiver device snoops the first packet P1 on the wireless link L2 during timing slot 2N, the second wireless transceiver device transmits the confirm packet, for example, the transmission Tx to the first wireless transceiver device 110. Each secondary wireless transceiver device (each of the second wireless transceiver devices 121 to 123) transmits the confirm packet to the primary wireless transceiver device (first wireless transceiver device 110) in different time period (different channel). For example, the second wireless transceiver device 121 transmits the confirm packet to the first wireless transceiver device 110 in the time period T1, the second wireless transceiver device 122 transmits the confirm packet to the first wireless transceiver device 110 in the time period T2, and the second wireless transceiver device 123 transmits the confirm packet to the first wireless transceiver device 110 in the time period T3.

If the first wireless transceiver device 110 receives the confirm packet (for example, the reception Rx illustrated in FIG. 2), during timing slot 2N, from all second wireless transceiver devices 121 to 123, it means that all second wireless transceiver devices 121 to 123 snoop the first packet P1 on the wireless link L2, that is, the entire of the pseudo single device 100' receives the first packet P1. The second wireless transceiver devices 121 to 123 could obtain the first packet P1 through the snooping process. As a result, the first wireless transceiver device 110 and the second wireless transceiver devices 121 to 123 get the first packet P1 simultaneously.

As shown in FIGS. 1E(a) and 2, when all of the first wireless transceiver device 110 and the second wireless transceiver devices 121 to 123 receive the first packet P1, the first wireless transceiver device 110 transmits a second packet P2 to the electronic device 10. In the present embodiment, the second packet P2 is an acknowledgement (ACK) packet. Due to the assimilation link L1, each second wireless transceiver device could snoop the wireless link L2 between the first wireless transceiver device 110 and the electronic device 10. When the second wireless transceiver device snoops the second packet P2 on the wireless link L2, the second wireless transceiver device transmits the confirm packet (for example, the transmissions Tx) to the first wireless transceiver device 110 during timing slot 2N+1 of FIG. 2.

In another embodiment, when any of the second wireless transceiver devices 121 to 123 does not snoop the first packet P1, the first wireless transceiver device 110 does not transmit the second packet P2 to the electronic device. Then, in next timing slot 2N, the electronic device 10 re-transmits the same first packet P1 to the first wireless transceiver device 110 of the pseudo single device 100' through the wireless link L2.

As shown in FIGS. 1E(b) and 2, when the second wireless transceiver device snoops the second packet P2 on the wireless link L2 during timing slot 2N+1, the second wireless transceiver device transmits the confirm packet, for example, the transmission Tx to the first wireless transceiver device 110. Then, the electronic device 10 could transmit next new first packet P1 to the first wireless transceiver device 110 through the assimilation link L1 in next timing slot 2N.

In another embodiment, when the second packet P2 does not include information (for example, audio information and/or control information), for example, the second packet P2 is an ACK packet, the second wireless transceiver devices 121 to 123 do not transmit the confirm packet (for example, the transmission Tx of FIG. 2 during timing slot 2N+1) to the first wireless transceiver device 110.

In addition, as shown in FIG. 2, during timing slot 2N, the first wireless transceiver device 110 and the second wireless transceiver device could exchange data (as shown as Rx, Tx, . . . ) for determining which of the first wireless transceiver device 110 and the second wireless transceiver device 120 could provide better transmitting quality. In step of transmitting the second packet P2 to the electronic device 10 (corresponding to FIG. 1E(a)), the second packet P2 is transmitted by one of the first wireless transceiver device 110 and the second wireless transceiver devices that can provide better transmitting quality, for example, the first wireless transceiver device 110.

In addition, the number of the second wireless transceiver devices could be one, two, four or more.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless signal transceiving method, comprises:
   establishing an assimilation link between a first wireless transceiver device and a second wireless transceiver device, such that the first wireless transceiver device and the second wireless transceiver device become a pseudo single device through an assimilation process;
   establishing a wireless link between the pseudo single device and an electronic device; and
   receiving, by the pseudo single device, a first packet wirelessly transmitted by the electronic device;

after the pseudo single device receives the first packet, transmitting, by the pseudo single device, a second packet to the electronic device;

wherein the wireless signal transceiving method further comprises:

when the second wireless transceiver device snoops the first packet, transmitting, by the second wireless transceiver device, a confirm packet to the first wireless transceiver device; and when the second wireless transceiver device snoops the second packet, transmitting, by the second wireless transceiver device, the confirm packet to the first wireless transceiver device.

2. The wireless signal transceiving method as claimed in claim 1, wherein the first wireless transceiver device is a primary wireless transceiver device, and the second wireless transceiver device is a secondary wireless transceiver device;

step of transmitting, by the pseudo single device, the second packet to the electronic device comprises:

when the primary wireless transceiver device receives the confirm packet, transmitting, by the primary wireless transceiver device, the second packet to the electronic device.

3. The wireless signal transceiving method as claimed in claim 1, wherein the first wireless transceiver device is a primary wireless transceiver device, and the second wireless transceiver device is a secondary wireless transceiver device, and the wireless signal transceiving method further comprises:

when the secondary wireless transceiver device does not snoop the first packet\, the primary wireless transceiver device does not transmit the second packet to the electronic device.

4. The wireless signal transceiving method as claimed in claim 1, wherein the first wireless transceiver device is a primary wireless transceiver device, and the second wireless transceiver device is a secondary wireless transceiver device, and the wireless signal transceiving method further comprises:

when the secondary wireless transceiver device does not snoop the second packet, re-transmitting, by the primary wireless transceiver device, the second packet signal to the electronic device.

5. The wireless signal transceiving method as claimed in claim 1, further comprises:

determining which of the first wireless transceiver device and the second wireless transceiver device provides better transmitting quality; and setting one of the first wireless transceiver device and the second wireless transceiver device that provides better transmitting quality as a primary wireless transceiver device, and another of the first wireless transceiver device and the second wireless transceiver device as a secondary wireless transceiver device;

wherein in step of transmitting the second packet to the electronic device, the second packet is transmitted by the primary wireless transceiver device.

6. The wireless signal transceiving method as claimed in claim 1, there is no need to transmit any audio packet between the first wireless transceiver device and the second transceiver wireless device.

7. The wireless signal transceiving method as claimed in claim 1, wherein the first packet is an audio packet.

8. The wireless signal transceiving method as claimed in claim 1, wherein the first wireless transceiver device and the second wireless transceiver device are wireless Bluetooth earphone, and the electronic device is a handheld electronic device.

9. The wireless signal transceiving method as claimed in claim 1, wherein the first wireless transceiver device is a primary wireless transceiver device, and a plurality of the second wireless transceiver devices are secondary wireless transceiver devices, step of receiving, by the pseudo single device, the first packet wirelessly transmitted by the electronic device comprises:

when each secondary wireless transceiver device snoops the first packet, transmitting, by each secondary wireless transceiver device, a confirm packet to the primary wireless transceiver device;

wherein step of transmitting, by the pseudo single device, the second packet to the electronic device comprises:

when the primary wireless transceiver device receives the confirm packet of each secondary wireless transceiver device, transmitting, by the primary wireless transceiver device, the second packet to the electronic device.

10. The wireless signal transceiving method as claimed in claim 9, wherein step of transmitting, by each secondary wireless transceiver device, the confirm packet to the primary wireless transceiver device further comprises:

transmitting, by each secondary wireless transceiver device, the confirm packet to the primary wireless transceiver device in different time period.

11. The wireless signal transceiving method as claimed in claim 1, wherein the first wireless transceiver device is a primary wireless transceiver device, and a plurality of the second wireless transceiver devices are secondary wireless transceiver devices, and the wireless signal transceiving method further comprises:

when any of the secondary wireless transceiver devices does not snoop the first packet, the primary wireless transceiver device does not transmit the second packet to the electronic device.

12. The wireless signal transceiving method as claimed in claim 1, wherein the first wireless transceiver device is a primary wireless transceiver device, and a plurality of the second wireless transceiver devices are secondary wireless transceiver devices, and the wireless signal transceiving method further comprises:

when any of the secondary wireless transceiver devices does not snoop the second packet, re-transmitting, by the primary wireless transceiver device, the second packet to the electronic device.

13. A wireless signal transceiving system, comprises:

an electronic device;

a first wireless transceiver device; and a second wireless transceiver device;

wherein the first wireless transceiver device and the second wireless transceiver device are configured to:

establish an assimilation link to become a pseudo single device through an assimilation process; and establish a wireless link between the pseudo single device with the electronic device;

wherein after the pseudo single device receives a first packet wirelessly transmitted by the electronic device, the pseudo single device transmits an second packet to the electronic device;

wherein the secondary wireless transceiver device is configured to transmit a confirm packet to the primary wireless transceiver device when the secondary wireless transceiver device snoops the first packet; and the secondary wireless transceiver device is configured to transmit the confirm packet to the primary wireless transceiver device when the secondary wireless transceiver device snoops the second packet.

14. The wireless signal transceiving system as claimed in claim 13, wherein the first wireless transceiver device is a primary wireless transceiver device, the second wireless transceiver device is a secondary wireless transceiver device, and the primary wireless transceiver device is configured to transmit the second packet to the electronic device when the primary wireless transceiver device receives the confirm packet.

15. The wireless signal transceiving system as claimed in claim 13, wherein the first wireless transceiver device is a primary wireless transceiver device, the second wireless transceiver device is a secondary wireless transceiver device, the primary wireless transceiver device does not transmit the second packet to the electronic device when the secondary wireless transceiver device does not snoop the first packet.

16. The wireless signal transceiving system as claimed in claim 13, wherein the first wireless transceiver device is a primary wireless transceiver device, the second wireless transceiver device is a secondary wireless transceiver device, the primary wireless transceiver device is configured to wirelessly transmit a second packet to the electronic device, and the primary wireless transceiver device is configured to re-transmit the second packet to the electronic device when the secondary wireless transceiver device does not snoop the second packet.

17. The wireless signal transceiving system as claimed in claim 13, wherein the first wireless transceiver device and the second wireless transceiver device determine which one provides better transmitting quality; one of the first wireless transceiver device and the second wireless transceiver device that provides better transmitting quality is set as a primary wireless transceiver device, and another of the first wireless transceiver device and the second wireless transceiver device is set as a secondary wireless transceiver device, and the primary wireless transceiver device is configured to transmit the second packet to the electronic device.

18. The wireless signal transceiving system as claimed in claim 13, wherein there is no need to transmit any audio packet to the transmitted signals between the first wireless transceiver device and the second transceiver wireless device.

19. The wireless signal transceiving system as claimed in claim 13, wherein the signal is an audio packet.

20. The wireless signal transceiving system as claimed in claim 13, wherein the first wireless transceiver device and the second wireless transceiver device are wireless Bluetooth earphone, and the electronic device is a handheld electronic device.

* * * * *

UNITED STATES PATENT AND TRADEMARK OFFICE
CERTIFICATE OF CORRECTION

Page 1 of 1

PATENT NO. : 10,778,827 B2
APPLICATION NO. : 16/683831
DATED : September 15, 2020
INVENTOR(S) : I-Feng Su It is certified that error appears in the above-identified patent and that said Letters Patent is hereby corrected as shown below:

On the Title Page

Item (72) Applicant's nationality JP (JAPAN) should read TW (Taiwan)

Signed and Sealed this
Twentieth Day of October, 2020

Andrei Iancu
*Director of the United States Patent and Trademark Office*